US008089579B1

(12) United States Patent
Johnson et al.

(10) Patent No.: US 8,089,579 B1
(45) Date of Patent: Jan. 3, 2012

(54) SYSTEM AND METHOD FOR PROVIDING A LIGHT CONTROL MECHANISM FOR A DISPLAY

(75) Inventors: Ricky J. Johnson, Shellsburg, IA (US); Donald E. Mosier, Cedar Rapids, IA (US); Craig E. Harwood, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 314 days.

(21) Appl. No.: 12/549,111

(22) Filed: Aug. 27, 2009

(51) Int. Cl.
*G02F 1/1335* (2006.01)
*G09F 13/04* (2006.01)

(52) U.S. Cl. ............. 349/62; 349/56; 349/64; 349/110; 362/97.1; 362/97.2

(58) Field of Classification Search .............. 349/56, 349/57, 64, 62, 104, 112, 193, 110, 111; 362/97.1, 97.2, 97.3, 97.4
See application file for complete search history.

(56) References Cited

U.S. PATENT DOCUMENTS

| | | | | |
|---|---|---|---|---|
| 5,827,624 | A * | 10/1998 | Stansbury | 430/5 |
| 6,346,931 | B1 * | 2/2002 | Cathey et al. | 345/74.1 |
| 6,429,582 | B1 * | 8/2002 | Watkins et al. | 313/495 |
| 7,806,982 | B2 * | 10/2010 | Park et al. | 118/720 |
| 2003/0080674 | A1 * | 5/2003 | Rasmussen et al. | 313/495 |
| 2006/0213442 | A1 * | 9/2006 | Park et al. | 118/720 |
| 2008/0057850 | A1 * | 3/2008 | Park | 454/184 |

\* cited by examiner

*Primary Examiner* — Brian Healy
(74) *Attorney, Agent, or Firm* — Donna P. Suchy; Daniel M. Barbieri

(57) ABSTRACT

The present invention is a display assembly including: a display, a backlight module and a plurality of grills. The backlight module generates light rays for illuminating the display. The generated light rays exit the backlight module and are directed to a set of grills (ex.—Black Matrix substrates), which are configured between the backlight module and the display. The grills are configured for allowing a first portion of the light rays (ex.—light rays directed toward an eye position of a viewer of the display) to pass through the grills to the display, but are also configured for blocking a second portion of the light rays (ex.—light rays directed away from the viewer), thus preventing the second portion of light rays from reaching the display. The first portion of light rays are then received by and emitted from the display towards the eye position of the viewer.

20 Claims, 4 Drawing Sheets

SYSTEM AND METHOD FOR PROVIDING A LIGHT CONTROL MECHANISM FOR A DISPLAY

FIELD OF THE INVENTION

The present invention relates to the field of displays and particularly to system(s) and method(s) for providing a light control mechanism for a display.

BACKGROUND OF THE INVENTION

Current display assemblies may not provide a desired level of performance.

Thus, it would be desirable to provide a display assembly which obviates problems associated with current solutions.

SUMMARY OF THE INVENTION

Accordingly, an embodiment of the present invention is directed to a display assembly, including: a display panel; a backlight module, the backlight module being operationally coupled to the display panel, the backlight module configured for providing a plurality of light rays and directing the plurality of light rays to the display panel for illuminating the display panel; and a plurality of grills, the plurality of grills being configured between the backlight module and the display panel, the plurality of grills configured for allowing a first light ray included in the plurality of light rays to pass through the grills to the display panel, the plurality of grills being further configured for blocking a second light ray included in the plurality of light rays, thereby preventing said second light ray from passing through the grills to the display panel, wherein the first light ray is received by the display panel and is emitted from the display panel toward an eye position of a viewer of the display panel.

An additional embodiment of the present invention is directed to a method for providing a light control mechanism in a display assembly, said method including: emitting a plurality of light rays from a backlight module of the display assembly; directing a first set of light rays included in the plurality of light rays through a plurality of grills of the display assembly to a display panel of the display assembly for illuminating the display panel of the display assembly; blocking a second set of light rays included in the plurality of light rays via the plurality of grills of the display assembly, thereby preventing the second set of light rays from passing through the plurality of grills of the display assembly to the display panel of the display assembly; receiving the first set of light rays at the display panel; and emitting the first set of light rays from the display assembly via the display panel, wherein the first set of light rays may be emitted from the display panel toward an eye position of a viewer of the display assembly.

A further embodiment of the present invention is directed to a method for providing a light control mechanism in a display assembly, said method including: emitting a plurality of light rays from a backlight module of the display assembly; passing the plurality of emitted light rays through a Light Control Film layer of the display assembly to a plurality of grills of the display assembly; directing a first set of light rays included in the plurality of light rays through the plurality of grills of the display assembly to a diffuser of the display assembly; blocking a second set of light rays included in the plurality of light rays via the plurality of grills of the display assembly, thereby preventing the second set of light rays from passing through the plurality of grills of the display assembly; passing the first set of light rays through the diffuser of the display assembly to the display panel of the display assembly; receiving the first set of light rays at the display panel of the display assembly; emitting the first set of light rays from the display assembly via the display panel of the display assembly.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
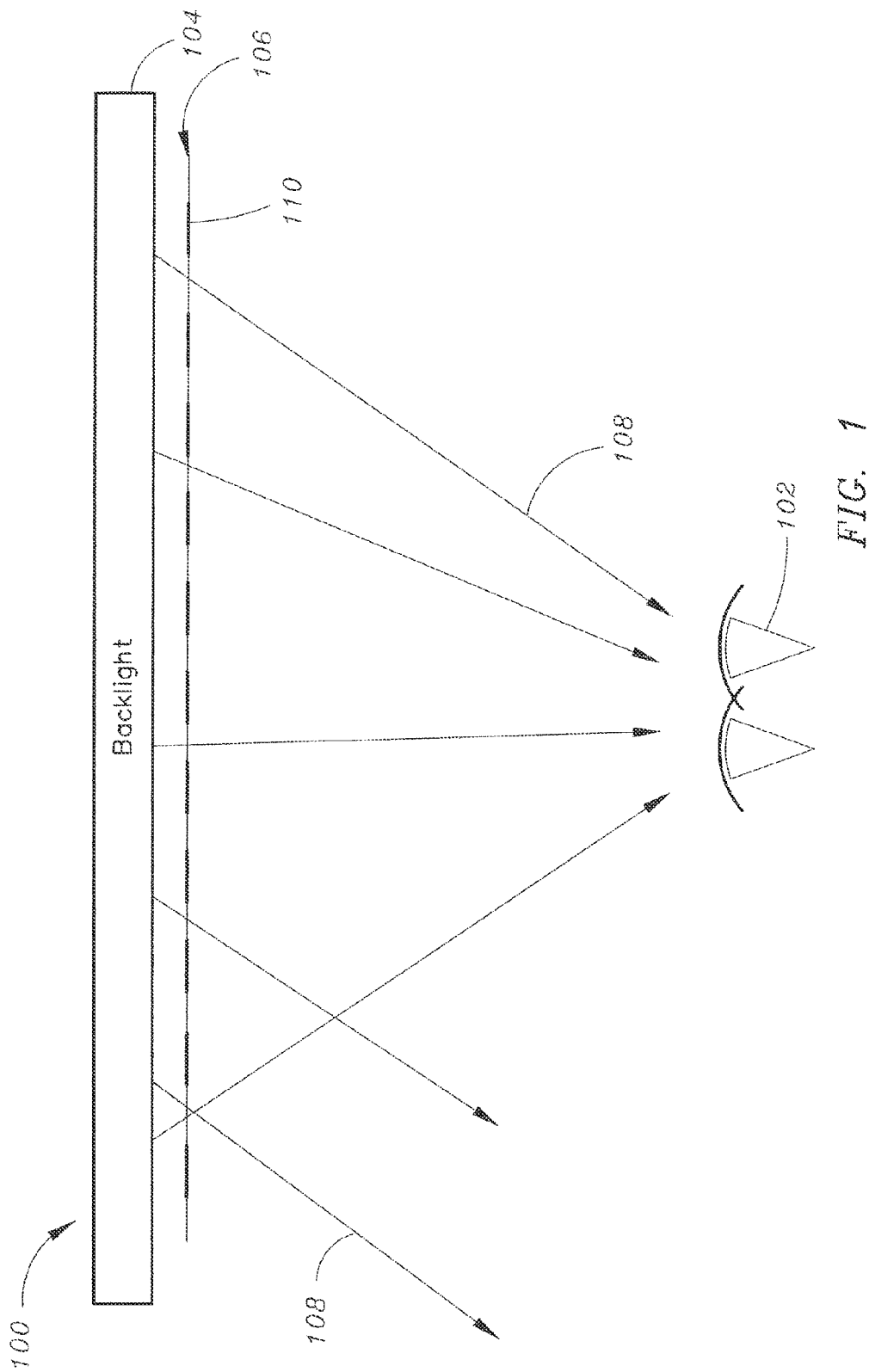
FIG. 1 is a block diagram illustration of a display assembly.

Referring to FIG. 1, a display assembly/display system 100 is shown. In the illustrated embodiment, the display assembly 100 is being implemented in an aircraft cockpit for displaying/providing a visual indication of information (ex.—navigational information, weather information, etc.) to a pilot 102 who is operating the aircraft and viewing the display assembly 100. The display assembly 100 includes a backlight/backlight module 104 and a display/display panel/display screen 106 (ex.—a Liquid Crystal Display (LCD)/LCD display). The backlight 104 may be connected/operationally coupled to the display 106. Further, the backlight 104 may be configured for providing/generating light/light rays/light beams 108 and for directing the light rays 108 to/towards the display 106 for illuminating the display 106. The display 106 may be configured for receiving the light rays 108 and for allowing the light rays 108 to be emitted from/via the display 106. The emitted light rays 108 may exit the display 106 in various directions (as shown in FIG. 1).

In the illustrated embodiment, the display/LCD 106 includes an Internal Black Matrix structure 110 located within the display 106. The Internal Black Matrix structure 110 of the display 106 may be configured for allowing a first portion of the provided light rays 108 to be emitted from/via the display 106, while preventing/blocking a second portion of the provided light rays 108 from being emitted from/via the display 106, which may thereby provide enhanced color contrast for images displayed via the display 106. However, when implementing the display assembly/system 100 shown in FIG. 1, some (ex.—an excessive amount) of the light rays 108 which may be allowed to exit/which may be emitted from the display 106 may be directed toward the canopy or windscreen of the cockpit. The emitted light rays 108 which are directed toward the canopy may cause/create excessive glare/reflections/images on the canopy, which may be distracting to the pilot 102 and may raise safety concerns. For aircraft implementing larger displays and/or for aircraft equipped with open canopy cockpits, the above-referenced problems may be magnified. In some instances, fiber optic faceplates may be implemented as part of the display assembly 100 in an attempt to control the direction in which the light rays 108 are emitted from the display 106. However, implementation of such faceplates, particularly the larger-sized faceplates, may be prohibitively expensive.

The system(s)/method(s) of the exemplary embodiments of the present invention disclosed herein provide a mechanism(s) for directing light rays provided by a backlight of a display assembly so that said light rays, when emitted from a display/display panel of the display assembly, are emitted in a manner which may promote a reduction in distractions for a viewer of the display. Said mechanism(s) of the exemplary embodiments of the present invention may achieve this by promoting an increase in the proportion of the emitted light rays which are directed towards an eye position of a person who is viewing/facing the display (ex.—an aircraft pilot) and also, by promoting a decrease in the proportion of the emitted light rays which are directed away from the eye position of the viewer of the display (ex.—emitted light rays which are directed towards a canopy of an aircraft cockpit). Further, the system(s)/method(s) of the exemplary embodiments of the present invention may provide the above-referenced mechanism(s), while still allowing the emitted light rays to provide a desired degree/level of luminance for illuminating the display.

Figure 2:
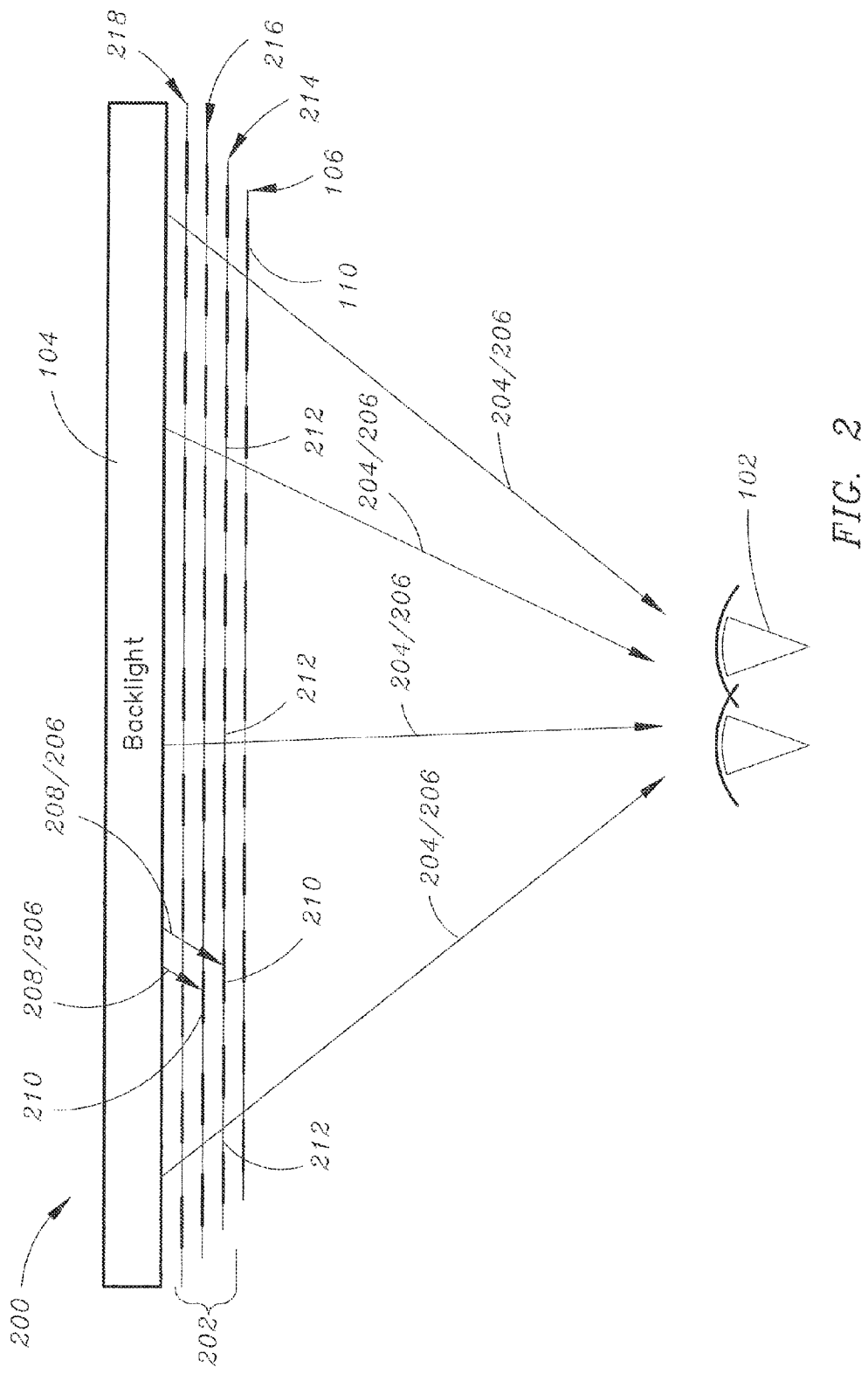
FIG. 2 is a block diagram illustration of a display assembly implementing a light control mechanism in accordance with an exemplary embodiment of the present invention.

Referring to FIG. 2, a display assembly/display system 200 in accordance with an exemplary embodiment of the present invention is shown. The display assembly 200 may include a backlight/backlight module 104 and a display/display panel/display screen 106 (ex.—a Liquid Crystal Display (LCD)/LCD display), which may be configured/may function as described above. However, the display assembly 200 shown in FIG. 2 may further include a plurality of (ex.—at least two) grills 202 which may be connected/operationally coupled between the backlight 104 and the display 106 (ex.—behind the display/LCD 106). In exemplary embodiments of the present invention, the grills 202 may be Black Matrix substrates. For example, each of the grills 202 may be a substrate (ex.—a glass plate) upon which a Black Matrix resin has been patterned (ex.—via lithography, laser patterning, etc.) to provide the Black Matrix substrates/the grills 202.

In further embodiments, each of the grills 202 may be configured to function as a light shielding film/light shielding substrate. For instance, the grills 202 may allow a first portion 204 (ex.—at least a substantial portion) of a set of backlight-provided light rays 206 to pass/traverse through the grills 202 to the display/LCD 106, while blocking a second portion 208 (ex.—at least one light ray) of the set of backlight-provided light rays 206 from passing through the grills 202 to the LCD 106. For example, each of the grills 202 may include a plurality of shielding regions/blocking regions 210 (ex.—portions of the grills 202 on which the Black Matrix residue is patterned), which when contacted by light rays (ex.—the first portion 204 of the set of backlight-provided light rays 206) may be configured for blocking said light rays 204/preventing said light rays 204 from passing through the grills 202 to the LCD 106. Further, each of the grills 202 may also include a plurality of passage regions 212 configured for allowing light rays (ex.—the second portion 208 of the set of backlight-provided light rays 206) to pass through/traverse through the grills 202 to the LCD 106 so that the second portion 208 of the set of light rays 206 may illuminate the LCD 106.

In exemplary embodiments of the present invention, the grills 202 may be configured such that a spatial pitch of each of the grills 202 may be larger than a spatial pitch of the Internal Black Matrix structure 110 within the display/LCD 106 (as shown in FIG. 2). For example, the display assembly 200 shown in FIG. 2 implements a first grill 214, a second grill 216 and a third grill 218. The first grill 214 may be configured between the display 106 and the second grill 216 and may have a spatial pitch which is larger than the spatial pitch of the Internal Black Matrix structure 110 of the display 106. The second grill 216 may be configured between the first grill 214 and the third grill 218 and may have a spatial pitch which is larger than the spatial pitch of the first grill 214. The third grill 218 may be configured between the second grill 216 and the backlight 104 and may have a spatial pitch which is larger than the spatial pitch of the second grill 216.

By implementing the plurality of grills 202 such that said grills 202 have the relative spatial pitch size relationships described above and are oriented/configured/positioned as described above, the display assembly 200 of FIG. 2 may promote provision of a less scattered emission pattern than the display assembly 100 of FIG. 1. For example, if the display assembly 200 is implemented in an aircraft cockpit, the display assembly 200 may promote/provide an increase (ex.—compared to the display assembly 100 of FIG. 1) in the proportion of emitted light rays 208 which are directed towards an eye position/eyes/eye location of a person (ex.—pilot 102) who is/may be viewing/facing the display 106 and may block/prevent emission of a larger proportion (ex.—compared to the display assembly 100 of FIG. 1) of backlight module-provided light rays 204 which are directed towards the canopy of the cockpit/away from the eye position of the viewer/pilot 102. Thus, the grills 202 of the display assembly 200 of illustrated embodiment (FIG. 2) of the present invention may promote reduction in visual distractions to the viewer/pilot 102 caused by unwanted glare/reflections on the cockpit canopy, while still being configured (ex.—via the passage regions 212) to allow for emission of light rays 206/208 to the degree necessary to provide a desired level of luminance for illuminating the display 106. Further, in the display assembly 200 shown in FIG. 2, the grills 202 provide a proprietary/supplemental mechanism for light control/light directing/light steering which may work in conjunction with the Internal Black Matrix structure 110 of the display 106 to provide a more desirable light emission pattern than systems (such as display assembly 100 shown in FIG. 1) which do not implement said grills 202.

In further embodiments, overall performance/degree of performance of the display assembly 200 may be configurable/adjustable by changing any one or more of a number of factors: number of grills 202 being implemented; pitch of passage regions/grill openings 212 relative to openings of the display 106; size of passage regions/grill openings 212; relative spacing between grills 202; relative spacing between grill(s) 202 and display 106; horizontal/vertical offset of the grills 202 relative to the display 106. For instance, selective directing/steering of the light rays 206 in a generally horizontal plane (ex.—to accommodate wider LCDs) and/or in a generally vertical plane (ex.—to allow a pilot's eye position to be above the normal to the LCD/LCD surface) may be achieved by varying one or more of the above-referenced factors.

In additional embodiments, the display assembly 200 may implement Light Control Film (LCF) and/or other films for preconditioning the light rays 206 as the light rays 206 exit the backlight module 102, said films being configured between the backlight module 102 and the grills 202. In further embodiments, a diffuser (ex.—a very light diffuser) may be implemented directly behind the LCD 106 (ex.—between the LCD 106 and the first grill 214) for promoting mitigation of the potential for Moire Patterns. In still further embodiments, the grills 202 may be fabricated on the same production lines as LCD color filter substrates. In alternative embodiments, the display assembly 200 may be a display assembly which is configured for implementation in any one of a number of various environments and/or systems/on-board various types of vehicles, etc. and is not limited to being an aircraft cockpit/flight deck display assembly.

Figure 3:
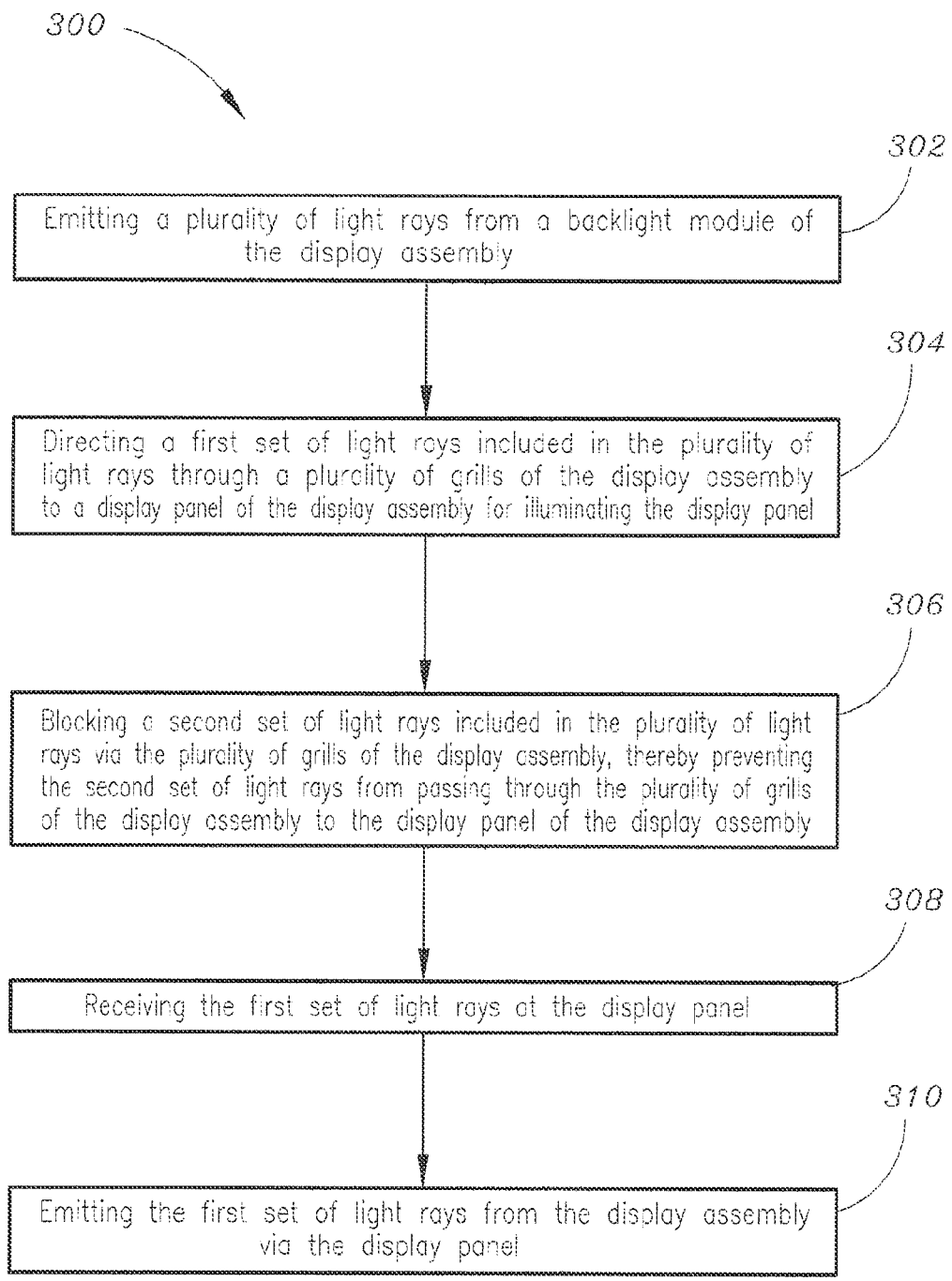
FIG. 3 is a flow chart illustrating a method for providing a light control mechanism for a display assembly in accordance with an exemplary embodiment of the present invention.

Referring to FIG. 3, a flowchart illustrating a method for providing a light control mechanism for/in/via the display 200 assembly of the present invention in accordance with an exemplary embodiment of the present invention is shown. The method 300 may include the step of emitting a plurality of light rays from a backlight module of the display assembly 302. The method 300 may further include the step of directing a first set of light rays included in the plurality of light rays through a plurality of grills of the display assembly to a display panel of the display assembly for illuminating the display panel of the display assembly 304. The method 300 may further include the step of blocking a second set of light rays included in the plurality of light rays via the plurality of grills of the display assembly, thereby preventing the second set of light rays from passing through the plurality of grills of the display assembly to the display panel of the display assembly 306. The method 300 may further include receiving the first set of light rays at the display panel 308. The method 300 may further include emitting the first set of light rays from the display assembly via the display panel 310. For instance, the first set of light rays may be emitted from the display panel toward an eye position of a viewer of the display panel.

Figure 4:
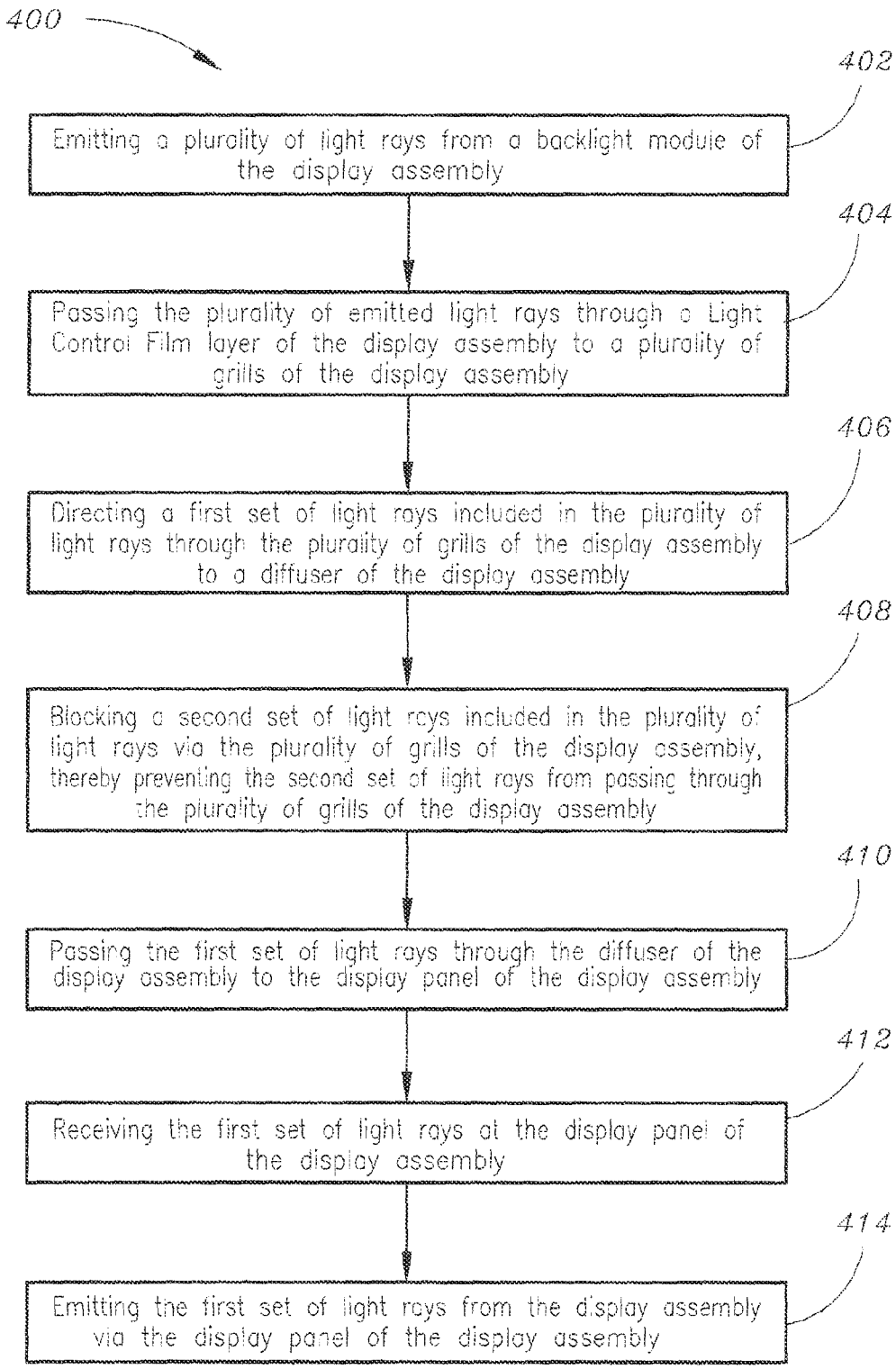
FIG. 4 is a flow chart illustrating a method for providing a light control mechanism for a display assembly in accordance with an alternative exemplary embodiment of the invention.

For embodiments of the display assembly of the present invention which implement Light Control Film and a diffuser, FIG. 4 is a flowchart illustrating a method for providing a light control mechanism for/in/via said display assembly of the present invention. The method 400 may include the step of emitting a plurality of light rays from a backlight module of the display assembly 402. The method 400 may further include the step of passing the plurality of emitted light rays through a Light Control Film layer of the display assembly to a plurality of grills of the display assembly 404. The method 400 may further include the step of directing a first set of light rays included in the plurality of light rays through the plurality of grills of the display assembly to a diffuser of the display assembly 406. The method 400 may further include the step of blocking a second set of light rays included in the plurality of light rays via the plurality of grills of the display assembly, thereby preventing the second set of light rays from passing through the plurality of grills of the display assembly 408.

Further, the method 400 may include the step of passing the first set of light rays through the diffuser of the display assembly to the display panel of the display assembly 410. The method 400 may further include the step of receiving the first set of light rays at the display panel of the display assembly 412. The method 400 may further include the step of emitting the first set of light rays from the display assembly via the display panel of the display assembly 414. For instance, the first set of light rays which are emitted via the display panel may be directed toward an eye position of a viewer of the display panel.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A display assembly, comprising:
   a display panel;
   a backlight module, the backlight module being operationally coupled to the display panel, the backlight module configured for providing a plurality of light rays and directing the plurality of light rays to the display panel for illuminating the display panel; and
   a plurality of grills, the plurality of grills being configured between the backlight module and the display panel, the plurality of grills configured for allowing a first light ray included in the plurality of light rays to pass through the grills to the display panel, the plurality of grills being further configured for blocking a second light ray included in the plurality of light rays, thereby preventing said second light ray from passing through the grills to the display panel,
   wherein the first light ray is received by the display panel and is emitted from the display panel.

2. A display assembly as claimed in claim 1, wherein the first light ray is emitted from the display panel toward an eye position of a viewer of the display panel.

3. A display assembly as claimed in claim 1, wherein the display panel is a Liquid Crystal Display.

4. A display assembly as claimed in claim 1, wherein the display panel includes an Internal Black Matrix structure.

5. A display assembly as claimed in claim 1, wherein each grill included in the plurality of grills is a Black Matrix substrate.

6. A display assembly as claimed in claim 1, further comprising:
   a Light Control Film, the Light Control Film being configured between the backlight module and the plurality of grills, the Light Control Film being further configured for preconditioning the plurality of light rays provided by the backlight module as the plurality of light rays exit the backlight module.

7. A display assembly as claimed in claim 1, further comprising:
   a diffuser, the diffuser being configured between the display panel and the plurality of grills.

8. A display assembly as claimed in claim 4, wherein at least one grill included in the plurality of grills has a spatial pitch larger than a spatial pitch of the Internal Black Matrix structure of the display panel.

9. A method for providing a light control mechanism in a display assembly, comprising:
   emitting a plurality of light rays from a backlight module of the display assembly;

directing a first set of light rays included in the plurality of light rays through a plurality of grills of the display assembly to a display panel of the display assembly for illuminating the display panel;

blocking a second set of light rays included in the plurality of light rays via the plurality of grills of the display assembly, thereby preventing the second set of light rays from passing through the plurality of grills of the display assembly to the display panel of the display assembly; and receiving the first set of light rays at the display panel.

10. A method as claimed in claim 9, further comprising:
emitting the first set of light rays from the display assembly via the display panel.

11. A method as claimed in claim 10, wherein the first set of light rays is emitted from the display panel toward an eye position of a viewer of the display panel.

12. A method as claimed in claim 9, wherein the display panel is a Liquid Crystal Display.

13. A method as claimed in claim 9, wherein the plurality of grills are Black Matrix substrates.

14. A method as claimed in claim 9, wherein each grill included in the plurality of grills has a spatial pitch larger than a spatial pitch of an Internal Black Matrix structure of the display panel.

15. A method for providing a light control mechanism in a display assembly, comprising:
emitting a plurality of light rays from a backlight module of the display assembly;

passing the plurality of emitted light rays through a Light Control Film layer of the display assembly to a plurality of grills of the display assembly;

directing a first set of light rays included in the plurality of light rays through the plurality of grills of the display assembly to a diffuser of the display assembly; and blocking a second set of light rays included in the plurality of light rays via the plurality of grills of the display assembly, thereby preventing the second set of light rays from passing through the plurality of grills of the display assembly.

16. A method as claimed in claim 15, further comprising:
passing the first set of light rays through the diffuser of the display assembly to the display panel of the display assembly.

17. A method as claimed in claim 16, further comprising:
receiving the first set of light rays at the display panel of the display assembly.

18. A method as claimed in claim 17, further comprising:
emitting the first set of light rays from the display assembly via the display panel of the display assembly.

19. A method as claimed in claim 18, wherein the first set of light rays are directed toward an eye position of a viewer of the display panel.

20. A method as claimed in claim 19, wherein the plurality of grills are Black Matrix substrates, the Black Matrix substrates each configured with a larger spatial pitch than a spatial pitch of an Internal Black Matrix structure of the display panel.

* * * * *